United States Patent Office

2,917,387
WAX TREATMENT OF COFFEE BEANS

Max Specht, deceased, late of Hankensbuttel, Germany, by Klara Specht and Verena Claire Specht, heirs, both of Hankensbuttel, Germany, assignor of one-half to Paul O. Tobeler, doing business under the name of Trans-Oceanic, Los Angeles, Calif.

No Drawing. Application October 28, 1957
Serial No. 692,567

9 Claims. (Cl. 99—68)

This invention relates generally to the treatment of green coffee beans preparatory to roasting them, and more particularly has to do with the processing of green beans to inhibit so-called "perspiration" thereof during roasting.

It is known that during roasting, coffee has a tendency to exude moisture, and that air from the bean interior cell tissue appearing at the unprotected bean surface subjects the latter to oxidation, so that eventually the coffee, as a result of these occurrences, takes on an unpleasant, old, stale and rancid taste. Efforts made to protect coffee beans against oxidation by coating or glazing them with harmless resins and waxes other than coffee wax, and mixtures thereof, have met with unsatisfactory results, so that attention was returned to roasting the coffee with greater care.

It has also been suggested that coffee beans be roasted in the presence of oil or fatty substances, as for example in a bath of hot oil; however, such procedures gave the beans an undesirably oily appearance and quality, and did not contribute to the preservation of the coffee aroma.

The present invention has for its major object the prevention of coffee bean "perspiration," i.e. the appearance of oils and moisture on the coffee bean surfaces, during roasting, and it accomplishes this objective through a process of applying a protective coating to green bean surfaces prior to roasting, the coating consisting of coffee wax extract obtained during the process of removing caffeine from coffee beans. According to the invention, the amount of wax supplied to the beans is sufficient to provide a slight excess over the original wax content of the coffee, so that after roasting is completed the wax content will be the same as was characteristic of the green beans before processing thereof. As a result, the moisture and oil sealing effect of the wax is maintained throughout roasting and subsequent storage of the beans, which continue to present a desirably pleasant and clean appearance. The applied coffee wax coating does not remain lacquer-like upon the bean surface as do resinous glazing compounds, but penetrates surprisingly quickly into the outer seed layers.

Tests have shown that when coffee beans, not treated in accordance with this invention, are roasted, losses of the wax content thereof occur, allowing the escape of moisture and coffee oils, which appear on the bean surfaces as shiny layers. About 16% of the bean weight is lost during roasting, of which 3% consists of waxes which were situated in the outer layers of the beans. However, when coffee beans are treated by the methods of the present invention, the escape of moisture and coffee oils during roasting, and of air from the bean interiors, is greatly inhibited by the maintenance of sufficient coffee wax in the beans to compensate for wax losses during roasting.

Coffee wax for treating green beans is preferably obtained by extracting caffeine, wax and oils from beans, and then separating the wax extract from the oil and caffeine extract. A preferred method of so doing consists in first soaking the green beans in water at room or elevated temperature, then adding an extraction agent to the bath to remove the caffeine, wax and oils from the beans, then separating the bath containing the water, extraction agent, wax, oils and caffeine from the beans, and finally simmering the bath at elevated temperature to vaporize the extraction agent and form a solid wax residue layer on the water surface after cooling, the wax itself having a low-melting point. The solid wax residue is then boiled out in water to separate any caffeine impurities in the wax, which impurities leave the wax particles and are removed in the water. As an example, 300 grams of coffee wax are repeatedly boiled in separate 2 liter quantities of pure water, the wax solidifying in a layer at the water surface upon cooling after each boiling operation. The dried wax comprises a dark, brittle mass of conchoidal fracture and having the following characteristics:

| | |
|---|---|
| Acid content | percent__ 3.5 |
| Saponification content | do____ 7.09 |
| Phytostern content | do____ 1.60 |
| Melting point | ° centigrade__ 47.50 |

Typical extraction agents as referred to above include the following compounds:

| | Formula |
|---|---|
| Ethyl alcohol | $CH_3CHOH$ |
| Vinegar ester | $CH_3COOC_2H_5$ |
| Chlorated carbon hydrate | |
| Amylen | $C_5H_{10}$ |

The obtained wax, after purification, is then finely ground and dissolved in a preferably non-flammable, volatile liquid hydrocarbon, to form a concentrated solution suitable for spraying coffee beans. Especially suitable solvents are the following, the chlorated hydrocarbons being preferred:

| | Formula |
|---|---|
| Dichlormethane | $CH_2Cl_2$ |
| Chlormethyl | $CH_3Cl$ |
| Chloroform | $CHCl_3$ |
| Trichloraethylene | $C_2HCl_3$ |
| Tetrachloraethylene | $C_2Cl_4$ |
| Dichloroaethylene | $C_2H_2Cl_2$ |
| Ether (in limited amounts) | $(C_2H_5)_2O$ |
| Vinegar ester | $CH_3COOC_2H_5$ |
| Amylen | $C_5H_{10}$ |

Dichlormethane is an especially suitable and preferred solvent since it has a boiling point of about 40° C., and therefore at ordinary temperatures a 20% solution of wax can be obtained, which is easily sprayed on the beans to cover them evenly. Also, this solvent volatilizes rapidly to permit rapid air drying of the coated beans. The beans are stirred during spraying with the coating solution so as to obtain an even distribution of wax upon the beans.

Coffee beans from which the coating wax was obtained is not wasted but may be roasted, and packed in air-tight containers for immediate consumption as caffeine free coffee. Therefore, the loss of wax from this coffee is not objectionable. On the other hand, wax may be returned to the coffee beans from which the coating wax and caffeine were separated, the amount of wax return being sufficient to provide a slight excess, not more than 0.5% by weight, over the amount of wax originally in these beans. Preservation of the beans for long periods of time is thereby assured.

Example 12 cubic centimeters of a 20% solution of purified coffee wax is dichlormethane is sprayed upon 300 grams of green coffee beans, during stirring thereof. These beans did not have their caffeine, wax or oil content removed previously. After spraying is completed, the coated beans are air dried and then roasted, at the end of which the roasted beans have approximately the same wax content as they had prior to roasting.

What is claimed is:

1. In the treatment of green coffee beans preparing them for roasting, the steps that include forming a solution of coffee bean wax in a liquid coating vehicle, and coating green coffee beans with said solution, whereby the coating wax penetrates the beans for inhibiting perspiration thereof during roasting.

2. In the treatment of green coffee beans preparing them for roasting, the steps that include forming a solution of coffee bean wax in a liquid coating vehicle, and coating coffee beans from which caffeine, wax and oil have been extracted with said solution, whereby the coating wax penetrates the beans for inhibiting perspiration thereof during roasting.

3. In the treatment of green coffee beans preparing them for roasting, the steps that include forming a solution of coffee bean wax in a liquid coating vehicle, spraying green coffee beans with said solution to coat the beans, and drying said coated beans, whereby the coating wax penetrates the beans for inhibiting perspiration thereof during roasting.

4. The method of claim 3 in which the quantity of said coating wax returned to said other beans is not greater than 0.5% by weight of the wax content of said beans.

5. In the treatment of green coffee beans preparing them for roasting, the steps that include forming a concentrated solution of coffee bean wax in a volatile liquid hydrocarbon solvent, spraying green coffee beans with said solution to coat the beans, and air drying the coated beans, whereby said solvent volatilizes and said coating wax penetrates the beans for inhibiting perspiration thereof during roasting.

6. The method of claim 5 in which said solvent comprises dichlormethane.

7. In the treatment of green coffee beans preparing them for roasting, the steps that include forming a solution of coffee bean wax in a liquid coating vehicle, and coating coffee beans from which caffeine and wax have been extracted with a quantity of said solution sufficient to supply to the beans wax in excess of that which was removed therefrom, whereby the coating wax penetrates the beans for inhibiting perspiration thereof during roasting.

8. The method of claim 7 in which excess wax supplied to the beans is not greater than 0.5% by weight of wax extracted from the beans.

9. In the treatment of green coffee beans preparing them for roasting, the steps that include soaking coffee beans in a water bath, adding to the bath an extraction agent to remove coffee wax from the beans, separating the bath from the beans, volatilizing the extraction agent from the bath, cooling the bath to permit hardening of the wax at the surface thereof, and forming a solution of said wax in a liquid coating vehicle, and coating coffee beans with said solution, whereby the coating wax penetrates the beans for inhibiting perspiration thereof during roasting.

References Cited in the file of this patent

UNITED STATES PATENTS

| | | |
|---|---|---|
| 201,848 | Stowman | Mar. 26, 1878 |
| 2,210,819 | Reynolds | Aug. 6, 1940 |
| 2,594,385 | Blench | Apr. 29, 1952 |
| 2,665,992 | Naps | Jan. 12, 1954 |